United States Patent [19]

Macedo et al.

[11] 4,110,096

[45] * Aug. 29, 1978

[54] METHOD OF PRECIPITATION OF A DOPANT IN A POROUS SILICATE GLASS

[76] Inventors: Pedro B. Macedo, 6100 Highboro Dr., Bethesda, Md. 20034; Theodore A. Litovitz, 904 Devere Dr., Silver Spring, Md. 20903

[*] Notice: The portion of the term of this patent subsequent to Feb. 17, 1993, has been disclaimed.

[21] Appl. No.: 635,727

[22] Filed: Nov. 26, 1975

Related U.S. Application Data

[63] Continuation-in-part of Ser. No. 559,512, Mar. 18, 1975, abandoned, and Ser. No. 462,481, Apr. 22, 1974, Pat. No. 3,938,974.

[51] Int. Cl.² .................. C03C 15/00; C03C 17/00
[52] U.S. Cl. ........................ 65/30 R; 65/3 R; 65/31; 65/32; 65/60 D; 65/DIG. 7; 427/163
[58] Field of Search ............ 65/31, 60 D, 60 R, 30 R, 65/DIG. 7, 3 R, 32; 427/163

[56] References Cited

U.S. PATENT DOCUMENTS

| 2,336,227 | 12/1943 | Dalton | 65/31 |
|---|---|---|---|
| 2,355,746 | 8/1944 | Nordberg et al. | 65/31 |
| 2,522,524 | 9/1950 | Lukes | 65/31 |
| 3,364,148 | 1/1968 | Kiuel et al. | 252/301.1 |
| 3,650,598 | 3/1972 | Kitano et al. | 65/30 X |
| 3,864,113 | 2/1975 | Dumbaugh et al. | 65/60 D |
| 3,938,974 | 2/1976 | Macedo et al. | 65/30 R |
| 4,042,359 | 8/1977 | Schnabel | 65/31 X |
| 4,061,486 | 12/1977 | Jahn | 65/31 X |

FOREIGN PATENT DOCUMENTS

189,988  1967  U.S.S.R. .................. 65/31

*Primary Examiner*—S. Leon Bashore
*Assistant Examiner*—Frank W. Miga
*Attorney, Agent, or Firm*—George J. Neilan

[57] ABSTRACT

The present invention relates to a new glass material applicable in those situations where thermal and/or mechanical shock would limit the use of other glass materials, presently available. Dopants are deposited into the interconnected pores of a porous glass in a non-uniform manner such that upon consolidation and cooling the final article has its surface under compressive stress. Dopants may also be added to control color and other appearance features.

25 Claims, 8 Drawing Figures

METHOD OF PRECIPITATION OF A DOPANT IN A POROUS SILICATE GLASS

The invention herein described was made in the course of or under a contract or subcontract thereunder (or grant) with the Department of the Air Force.

The present invention relates to a new glass material applicable in those situations where thermal shock would cause ordinary glasses or ceramics to fracture or where increased strength is required independent of temperature. (Note: In this disclosure glass is meant to cover completely vitreous or partially devitrified glasses, e.g., ceramics.)

Ceramics have long been considered a useful material because of their ease of fabrication and relative low cost. Two of their most significant limitations are their inability to withstand thermal shock and their relatively low strength. This limits the use of such ceramics for many structural purposes and as cooking utensils, stove tops, radar domes, windshields, windows, and containers such as pipes and tubes, and storage or reaction vats for use in high temperature processing of chemicals and other materials.

The standard method for overcoming the thermal shock weakness has been to use or develop ceramics with low thermal expansivity. At present there are three feasible approaches:

(1) the use of pure fused quartz, (2) the use of Vycor*, and finally (3) the use of glass-ceramics. The last approach is also useful for increasing strength.

Each of the above has its limitations. The first two have such low modulus of rupture that in many applications

*"Vycor" is a registered trademark of the Corning Glass Co. they cannot be used. The third process (glass-ceramics) has all the desired thermo-mechanical properties but is dependent upon a rather complicated production process which makes it relatively expensive to produce.

It is a primary object of this invention to provide a new glass material with desirable thermo-mechanical properties and a method for economically producing same.

The desirable properties are:
(1) high modulus of rupture relative to Vycor, fused silica, Pyrex* and most other common glass materials,
(2) very low thermal expansivity, smaller than Pyrex.
(3) high upper use temperature superior to ceramics and glasses such as Pyrex.
(4) controllable appearance such that it can be made in forms which are transparent, opalescent, or any color,
(5) can be adapted to relatively low cost production techniques,
(6) can be used as cooking utensils, stove tops, radar domes, storage vats, pipes, and other places where high strengh-to-weight ratio, chemical inertness, and high use temperatures are needed.

An inexpensive method of making glass with silica content (and thus a low thermal expansivity) was first developed by Hood et al., U.S. Pat. Nos. 2,106,744 and 2,215,036. In this process a sodium borosilicate glass, which may be cast into any desired shape, is heat treated so that it undergoes phase separation with an interconnected micro-structure.

*"Pyrex" is a registered trademark of the Corning Glass Co. The alkali borate phase is ionic in nature and soluble in acids such as HCl, while the other phase consists mostly of covalently bonded silica containing a small amount of $B_2O_3$ and is insoluble in HCl. Hence the alkali borate phase may be removed by leaching with acid, leaving behind the silica rich skeleton. In the Hood process this silica skeleton is collaples by heating it to a temperature near $T_g$ (about 950° C), giving a homogeneous glass of high silica content, good chemical durability, high use temperature and low expansion coefficient.

In a previous application (U.S. Ser. No. 462,481 filed Apr. 22, 1974 now U.S. Pat. No. 3,938,974) we have described a process in which a phase-separable glass is converted to a porous form. This porous form is then converted to a solid glass article with either a uniform of non-uniform composition rofile across at least one cross-sectional axis, by adding modifying components to the porous material, and collapsing the article thus formed into a solid glass article. We have called the process of adding such composition modifying components "molecular stuffing."

We have found that such a process is not only applicable to the stuffing of porous matrices produced by the leaching of phase-separated glasses, but is also applicable to other inter-connective porous structures having a matrix constituted of at least one glass network forming material. One well-known process for forming interconnective porous structures other than the phase separation route is by chemical vapor deposition. A convenient description of such a process is contained in U.S. Pat. No. 2,272,342, issued to J. F. Hyde and U.S. Pat. No. 2,326,059 issued to R. E. Nordberg. More particularly, U.S. Pat. No. 3,859,073 issued to P. C. Schultz describes the formation of a porous body and its subsequent impregnation with a dopant. Such impregnation is concerned with the deposition of small quantitites of materials from relatively dilute solutions in the pores of the porous body.

In the present invention, molecular stuffing is used to improve the strength of glass material by introducing a composition profile across the thickness of the glass which gives rise in turn to a profile in thermo-mechanical properties. From now on such a composition profile which is designed to increase the thermal shock resistance and the mechanical strength of a material will be referred to as "the strengthening profile."

FIGURE CAPTIONS

In the drawings, FIG. 1 is a cross-section of a strengthened glass, showing regions (A) which have a different concentration than region (B).

Figure 1:
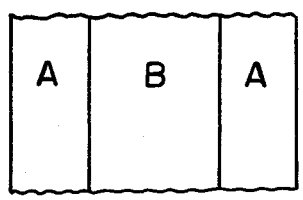

There are three ways of using the present invention to create a strengthening profile in a glass material:

1. In the first method, which from now on we shall call the $T_g$ method, using the present invention one can create a profile in the glass transition temperature, $T_g$. Such a composition profile is shown in FIG. 1 schematically, where region B is the silica phase doped by molecular stuffing and region A is undoped, relatively pure silica. Most network modifiers when dissolved in pure silica act to lower the glass transition temperature, $T_g$. As determined by thermal expansion, the difference in $T_g$ betweeen the relatively pure silica region A and the doped silica region B has roughly the effect on the volume temperature curves of the two compositions shown in FIG. 2. (Note the small amount of $B_2O_3$ actually present in glass A is sufficient to repress the negative expansion region that would be observed above $T_{gA}$ for extremely pure silica. Hence we refer here to glass A as "pure" silica only in comparison to doped glass B.)

Figure 2:
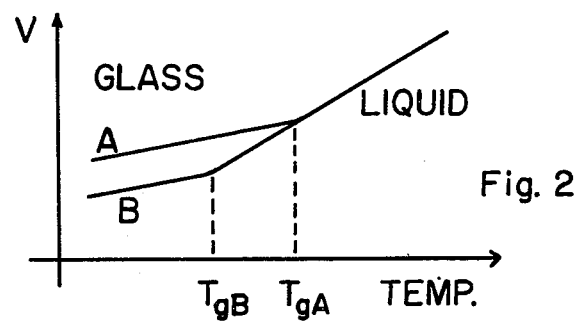
FIG. 2 is a plot of volume versus temperature showing different glass transition temperatures for regions A and B.

As shown in FIG. 2, when the material in FIG. 1 is cooled from the liquid, the pure silica composition A on the surface passes through the glass transition at $T_{gA}$, becoming rigid and experiences a large decrease in thermal expansion coefficient. The doped silica composition B in the interior, however, continues to contract with a liquid-like expansion coefficient down to the temperature $T_{gB}$ at which point it also becomes a rigid glass with low thermal expansion coefficient. The differential expansion between surface and interior in the temperature range $T_{gA}$ to $T_{gB}$ has the effect of placing the surface under a compressive stress. This compressive stress must be overcome before the surface can undergo fracture. Thus the $T_g$ profile achieved by molecular stuffing of silica results in the strengthening of the surface of the glass.

2. In the second method, which we shall, from now on, call "the expansion-coefficient" method, using the present invention one can create a profile in the expansion coefficient.

Figure 3:
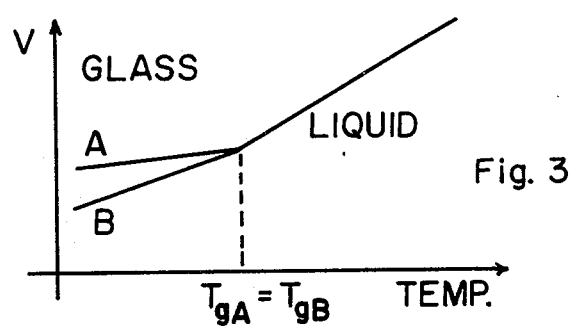
FIG. 3 is a plot of volume versus temperature showing different thermal expansion coefficients below the glass transition temperature for regions A and B.

The dopant in region B (FIG. 1) does not change the glass transition temperature $T_g$, but increases the expansion coefficient of the glass. Thus upon cooling the sample to room temperature from its glass transition temperature, region B shrinks by a greater amount than A, resulting in a compressive stress in A, which stress will increase the modulus of rupture of the sample. (See FIG. 3)

3. In the third method, which we shall, from now on, call "mixed method," using the present invention one can create simultaneously a profile in $T_g$ and a profile in the expansion coefficient. Mixed method is, therefore, a combination of the previous two methods.

The molecular stuffing strengthening process in this invention has certain similarities to chemical tempering by ion exchange, but there are important differences. In the chemical tempering process the concentration profile and compressive stress profile build up simultaneously as ion exchange occurs. Unfortunately this drastically limits the thickness of strengthened surface layers due to the fact that the rate of surface stress decay by viscous flow eventually exceeds the rate of stress buildup by diffusion. This limits the thickness of the compressive stress region, causing chemically tempered ceramics to be susceptible to failure owing to scratching. In molecular stuffing the concentration profile and surface stress are introduced in separate steps, so that there is no barrier to the production of thick surface layers. This allows the glass to retain its strength even when it sustains deep scratches.

Using the present invention, it is possible to control the appearance in addition to increasing the strength of a glass article. For example, if dopants are added which do not readily dissolve at consolidation temperatures (described below) they will give a milky or opalescent appearance to the sample. Such dopants are refractory oxides such as the oxides of aluminium, the alkaline earths, titanium, chromium, zirconium and zinc.

If color is desired, a transition metal or rare earth ion can be used. For example, under oxidizing conditions copper and iron will make the sample blue and brown or yellow respectively; under reducing conditions copper and iron will make the sample red and green respectively. Generally cobalt will make it blue, and neodynium, purple.

To obtain a smoky appearance one could use any element which contributes free electrons. Examples of these are germanium, tin, lead and bismuth, all in a reducing atmosphere. In addition the presence of colloidal metallic precipitates of the noble metals will create various smoky tints.

In any process for forming the glass articles of this invention, the formation of the porous matrix constitutes a value added step and losses (for example, breakage) after this stage may decrease the economic yield of a full-scale commercial process. We have found it difficult to determine the factors causing losses either through breakage due to cracking or the occurrence of light scattering centers such as inclusions or bubbles in the final collapsed article.

To obtain both increased yields and more control over refractive index profile consistently and satisfactorily, we have now and improved those stages of the process where it is necessary to operate in a particular manner, and in a particular sequence not previously disclosed.

With regard to yield, as in the normal manufacture of any glass article modifications to the process do not necessarily result in every article cast or formed being fault free and ensure that such articles will all survive the subsequent processing steps. By an increased yield we mean that we have found how to improve the statistical chances of a rod or other article surviving the processing steps. This is, however, on a statistical basis and one cannot guarantee that even when all the essential steps of our process are used, an acceptable product will always be obtained. As indicated previously, the improvement produced is not only in yield but in insuring that a desired strengthening profile is obtained consistently and satisfactorily.

This is primarily based on our discovery that for best results it is essential that the step of depositing the solid material in the pores be carried out by a process which does not involve evaporation of solvent, and that the subsequent heating step to raise the temperature of the article so as to remove the solvent from the pores, and, where necessary, decomposition products should be regulated so as to achieve retention or production of a desired strengthening profile.

We have also found that while achieving a satisfactory article, certain dopants give particularly advantageous results because of their physical characteristics.

We also perfer that, if the porous article to be stuffed has been made by phase separation from a glass followed by leaching, certain precautions be taken to reduce losses during the processing of the rod. We have found that cracking in this form of our process can be caused by problems arising from one or more of the following:
 (a) Incorrect glass composition;
 (b) Incorrect heat treatment conditions for phae-separation; and
 (c) Incorrect leaching procedure.

Guidance is given below as to how to choose glass composition and processing conditions so as to reduce loss due to cracking in subsequent processing both during the formation of the porous matrix and the subsequent stuffing and drying.

The present invention is concerned with a method of producing a desired strengthening profile in a glass article as a function of its dimensions by the addition of a strength modifying component (hereinafter referred to as a dopant) to a porous matrix with interconnective pores whose walls are formed from at least one glass network forming component and, where desired, glass network modifying components. The method comprises the steps of immersing the porous matrix in a solution of a dopant, causing the dopant to separate in the matrix, removing solvent and, where necessary, decomposition products from the porous matrix and collapsing the porous matrix to a solid form, characterized in that part or all of the dopant is caused to be precipitated by a method which does not involve evaporation of solvent, the removal of solvent is not commenced until a substantial part of the precipitation has taken place and the rate at which heat is applied to remove solvent, and where necessary, decomposition products is regulated so as to achieve and/or retain the desired strengthening profile within the glass article.

The steps and the sequence of steps which we have found suitable to produce a particular profile are outlined below, all starting with a porous article having interconnected pores.

The steps of our invention comprise the following:
(1) The dopant is precipitated in the pores by non-evaporative steps. These include (a) thermal precipitation in which by lowering the temperature of the object, the solubility of the dopant or dopant compound in the solvent is decreased sufficiently to cause precipitation of the dopant or dopant compound and (b) chemical precipitation such as alteration of solution pH to a point of precipitation, replacement of the original solvent by a solvent in which the dopant or dopant compound is less soluble or introduction of a chemical into the solution which reacts with original dopant or dopant compound to form a less soluble dopant species. Hereinafter the term solvent is used to describe the chemical species which at some stage is the liquid filling the pores.

(2) Removal of the final solvent is commenced only after precipitation is substantially complete.

(3) The rate at which heat is applied to remove solvent and where necessary, decomposition products, is regulated so as to achieve and/or retain the desired strengthening profile within the glass article.

Figure 4:
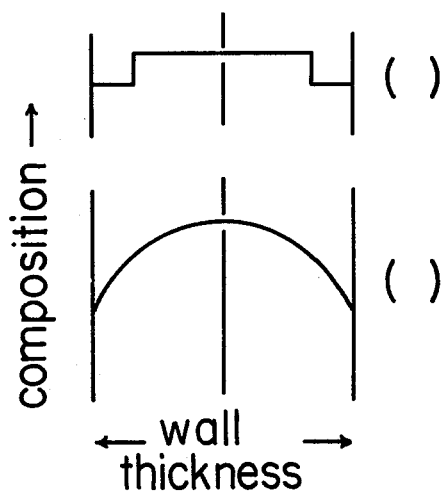
FIG. 4 shows schematically (a) stepped profile and (b) a continuous profile.
Figure 5:
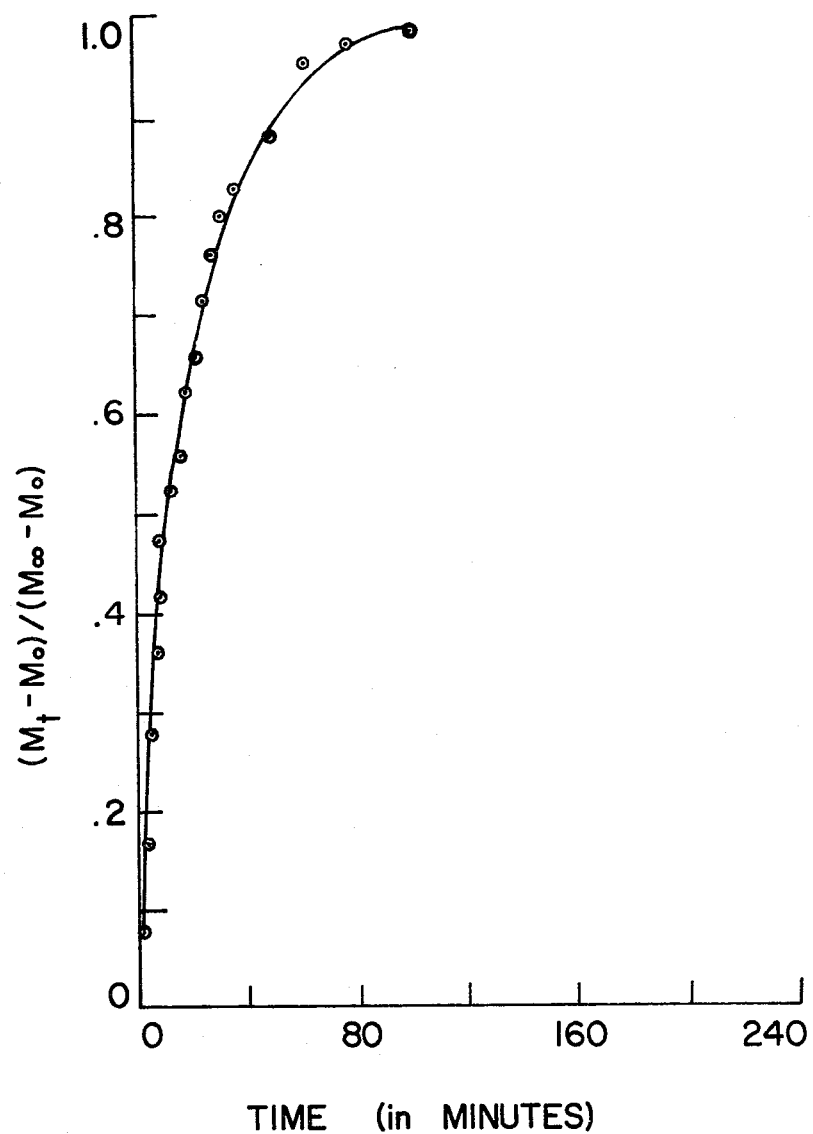
FIG. 5 is a plot of normalized weight gain versus time for stuffing of a porous rod with concentrated solution of $CsNO_3$ in water at 100° C.

The steps and the sequence of steps which we have found suitable to produce stepped profile (see FIG. 4a) and continuous profile (see FIG. 4b) are outlined below, starting with a porous article and using thermal precipitation of dopant or dopant compound.

Stepped profile (1)
 (a) Immerse the porous matrix in a solution of dopant or dopant compound.
 (b) Precipitate the dopant by dropping the temperature.
 (c) Immerse in a solvent for the dopant and allow the dopant to partially redissolve and diffuse out of the matrix. Only the dopant precipitated near the outer surface of the article is removed in this step.
 (d) Evapoate any solvent.
 (e) Heat to collapsing temperature.

(2) Alternatively:
 (a) Immerse the porous matrix in a solution of dopant or dopant compound.
 (b) Precipitate the dopant by dropping the temperature.
 (c) Partially dry the porous rod.
 (d) Immerse in a solvent for the dopant and allow the dopant to partially redissolve and diffuse out of the matrix. Only the dopant precipitated near the outer surface of the article is removed in this step.
 (e) Evaporate any remaining solvent.
 (f) Heat to collapsing temperature.

Continuous profile (a) Immerse the porous matrix in a solution of dopant or dopant compound.
 (b) Immerse in a solvent for the dopant at substantially the same temperature as that at which stuffing took place. The article remains in the solvent for a precalculated time.
 (c) By repeating step B with baths of varying dopant concentration, the diffusion time history can be controlled to create the desired profile of dopant in the article.
 (d) Precipitate dopant in pores by dropping temperature.
 (e) Evaporate the solvent.
 (f) Heat to collapsing temperature.

As indicated above, we prefer to use as a dopant a material whose solubility characteristics are such that we can achieve the desired concentration of the dopant in the pores, by diffusing a solution of the dopant into the pores at one temperature and then cause its precipitation by a simple drop in temperature. We refer to such a process as thermal precipitation. While we prefer to use this process, other routes are feasible. Our invention therefore includes a process for the production of a glass article with a desired strengthening profile using a suitable porous matrix as a starting material in which a strength modifying component is caused to separate out of solution by lowering the temperature of the solution.

Amongst other routes we find we can precipitate the solute by chemical means rather than by temperature drop. The common ion effect has been used to reduce solubilities and cause precipitation of the solute (e.g., the solubility of $CsNO_3$ in water is reduced in the presence of 1N $HNO_3$). The exchange of solvents has also been used to reduce solubilities and thus precipitation by means not involving evaporation of solvent can be used. These include the addition of a suitable precipitant which reacts with the dopant or cause a suitable change in pH. We have also used a combination of steps consisting of both thermal and chemical precipitation means. This is particularly useful in cases in which more than one dopant or dopant compound is being introduced into the pores. We avoid any precipitation methods involving evaporation of solvent as the sole means of precipitation, since we have been unable to obtain consistent results using such methods. We believe this is due to the following factors.

In the direct evaporative process the solution evaporates from the surface of the article causing transport of the dopant from the interior to the surface. There is also a vertical transport process due to gravity which causes accumulation of the dopant at the bottom of the article. Together these effects tend to produce undesirable profiles.

It is essential to regulate the rate of heating so as to avoid destroying either the incipient strengthening profile, or damaging the interconnective pore structure. It is possible by allowing the evolution of vapor or gas in an uncontrolled manner to produce a pressure sufficient to destroy the integrity of the structure. We prefer therefore to avoid allowing the solvent to reach its boiling point at a point when large volumes of vapor are liable to be produced. Various heating regimes are described below, and show how to regulate the heating to achieve the desired end.

The regulation of the solvent removal step is based on the need to avoid destruction of the integrity of the porous structure, and upsetting the distribution of the dopant in the pores. The precautions we take are to commence solvent removal at room temperature or below by a non-boiling method, and avoid any violent change in temperature which would cause an excessively fast evolution of solvent vapor in a confined space. Convenient methods of commencing solvent removal include placing the article, where the solvent is water, in a dessicator at about 22° C for about 24 hours, or in a vacuum at temperature slightly above 0° C. (i.e., 4° C) for about 4 hours, and then to proceed to raise the temperature. We have also found that it is necessary in some cases to hold or reduce the heating rate to a very low value so that the article says in a particular temperature range for a time sufficient to ensure particular events have occurred before heating is continued. At other points we believe it preferable to move rapidly from one temperature to another, e.g., when solvent removal has been completed to the temperature of collapse. Later in this specification we give some guidance in terms of an aqueous system, but the warnings given can be seen to apply equally to the system where organic solvents or other non-aqueous systems or mixtures of such systems are used.

The following criteria can be used to select a suitable dopant from among the larger group of strength modifying components.
(a) It must be soluble in suitable concentrations in a solvent which does not interfere with subsequent processing after stuffing.
(b) It must be able to be incorporated into the matrix either as deposited or after thermally induced decomposition.
(c) The dopant must not change its physical or chemical state in such a way before collapse as to be lost from the matrix.
(d) For high strength, the following added conditions apply:
  (1) When using $T_g$ method to create strengthening profile, the dopant must decrease the glass transition temperature of the porous matrix.
  (2) When using the expansion coefficient method to create strengthening profile, the dopant must increase the expansion coefficient of the porous matrix.
  (3) When using the mixed method to create strengthening profile, the dopant must decrease $T_g$ and must increase expansion coefficient simultaneously.

In this invention, since high light transmission is not a necessity, compounds of most elements can be used as dopants. For example, to create a $T_g$ profile the choice is not critical. Two useful dopants are $Na_2O$ and $B_2O_3$ which lower the $T_g$ of the matrix by 80° C and 40° C respectively for each percent of dopant. Others which can be used to create a $T_g$-profile include but are not limited to oxides or salts, such as chlorides, silicates, borates, phosphates, and germanates of lithium, potassium, boron, phosphorous, germanium and arsenic.

There are many dopants which can be used to increase the thermal expansion of the matrix. For example, cesium oxide raises the expansion coefficient. Other dopants which can be used include but are not limited to the oxides or salts of the heavy elements such as barium, lead, thallium, bismuth, thorium and uranium. In addition, oxides or salts of rubidium, strontium, antimony and tin may be used.

Other dopants and mixtures of dopants can be used as long as the above criteria are satisfied. It is impossible to list all the potential combinations of dopant elements but it is believed that based on the guidance given, such selection of useful combinations is within the competence of those practiced in the art.

In the selection of solvents the following considerations are important. The solvent selected
(a) should not damage the porous matrix;
(b) should be one that can be substantially removed by either exchange with another solvent, evaporation, or thermal decomposition followed by oxidation (or high temperature reaction with chemically active atmosphere);
(c) should have sufficient solubility for the dopant compound or combination of dopant compounds to allow the desired dopant levels within the pores to be achieved by molecular stuffing.
(d) should be such that, if used in thermal precipitation process, any dopant solutions in the solvent will have sufficiently high temperature dependence of solubility to deposit dopant within the pores when cooled;
(e) should be such that, when used to precipitate by a solvent exchange process, will have the specific solubility properties as needed by the process;
(f) should be, for economic considerations, low cost and capable of high speed of drying.

It is impossible to test all possible combinations of solvents; however we have found that water, alcohols, ketones, ethers, mixtures of these and salt solutions in these solvents can be used satisfactorily applying the above criteria to the selection of a particular solvent.

In general, we prefer to use thermal precipitation because of its ease and convenience, and because we prefer to carry out the first stage of the subsequent solvent removal step after stuffing at room temperature or below, and hence it is usually necessary to cool the stuffed article.

The dopants used are preferably water soluble and have a steep solubility coefficient, that is, that the material is very soluble at temperatures of the order of 100° C, and on cooling to room temperature or below, a substantial amount of material separates, thus making them suitable for thermal precipitation.

Further detailed guidance concerning the choice of solvent is given by reference to Table I below in which the solubility of various dopants in solvents at different temperatures are illustrated.

As already indicated above, in choosing a particular route to a desired end product, a number of guidelines need to be considered, and these can be illustrated by reference to Table I.

First, in order to obtain the desired concentration of tions has induced precipitation of the dopants. Typical solubilities are illustrated in Table I.

(4) Variation in dopant compound. The range of solubility of the dopant compounds may be altered by choosing a different anion such as replacing $CsNO_3$ by $Cs_2(CO_3)$ to increase solubility in water (see Table I, line 7).

TABLE I

| | Compound | Solubility gr/100 ml sol. | $H_2O$ | methanol | ethanol | 1-propanol | diethyl ether | $HNO_3$ | Temp. (° C) |
|---|---|---|---|---|---|---|---|---|---|
| 1. | $CsNO_3$ | >100 | 100% | | | | | | >95 |
| 2. | " | 10 | 100% | | | | | | 4 |
| 3. | " | 4 | | | | | | 1 Normal | 4 |
| 4. | " | 1 | | 30% | 70% | | | | 4 |
| 5. | $CsNO_3$ | 10 | | 70% | 30% | | | | 22 |
| 6. | " | 1 | | 15% | 85% | | | | 22 |
| 7. | $Cs_2CO_3$ | >100 | 100% | | | | | | 22 |
| 8. | " | 10 | | | 95% | | 5% | | 22 |
| 9. | " | 1 | | | 52% | 48% | | | 22 |
| 10. | $Pb(NO_3)_2$ | >100 | 100% | | | | | | >70 |
| 11. | " | 10 | | 30% | 70% | | | | 22 |
| 12. | " | 1 | | 5% | 95% | | | | 22 |
| 13. | $La(NO_3)_3$ | >100 | 100% | | | | | | 22 |
| 14. | " | 10 | | | 15% | | 85% | | 22 |
| 15. | " | 1 | | | 10% | | 90% | | 22 |
| | Compound | Solubility gr/100 ml sol. | $H_2O$ | Methanol | Ethanol | | Diethyl ether | $HNO_3$ | Temp. (° C) |
| 16. | $Nd(NO_3)_2$ | 20 | | 10% | | | 90% | | 22 |
| 17. | " | 1 | | 7% | | | 93% | | 22 |
| 18. | $Ba(NO_3)_2$ | 32 | 100% | | | | | | 95 |
| 19. | " | 10 | 100% | | | | | | 22 |
| 20. | " | 5 | 100% | | | | | | 0 |
| 21. | $Al(NO_3)_3$ | 63.7 | 100% | | | | | | 22 |
| 22. | $H_3BO_3$ | 27.6 | 100% | | | | | | 100 |
| 23. | " | 6.35 | 100% | | | | | | 22 | dopant in the article to yield a significant increase in strength, a solution having a sufficiently high concentration of dopant must be found by suitable choice of dopant compound, solvent and temperature. In order to precipitate the dopant or dopant compound, the use of solvents with sufficiently low solubility is necesssary. Often there is a need to remove substantial amounts of dopant from designated areas of the article, such as in the surface region of a glass article, in which case solvents with intermediate solubilities are useful. Such removal of dopant is referred to as unstuffing, as opposed to molecular stuffing. Suitable control of solubilities for proper precipitation of the dopant or dopand compound can be achieved by a number of methods.

(1) Thermal precipitation is most suitable for solvents whose solubility for the dopant or dopant compound is strongly temperature dependent. Thermal precipitation has the added advantage of being able to arrest diffusion in the shortest time, thus enabling us to freeze-in a desired composition profile with high accuracy.

This is illustrated for $CsNO_3$ dopant in Table I whereby the solubility changes from a desirable stuffing level at 95° C to a desirable unstuffing level at 4° C.

(2) Precipitation by common ion effect and thermal precipitation. Precipitation can be produced or further enhanced by the common ion effect. For example when the dopant is a nitrate the concentration of nitrate ions in solution is increased by adding another source of nitrate ions to the solvent (i.e. $HNO_3$ acid). This reduces the solubility of the nitrate dopant (see $CsNO_3$, Table 1).

(3) Precipitation by solvent exchange. Precipitation is induced by substituting a low solubility solvent for a higher solubility solvent. The high solubility of nitrates in water has allowed us to use water as solvent for the stuffing process. Exchange of water with either alcohols, ketones or ethers or combina- As indicated above, when operating the process of the present invention with a porous interconnective structure which has been produced by the phase separation of a suitable glass followed by a leaching step, it is necessary to optimize the various stages of the process in order to achieve consistently and satisfactorily a saleable end product in good economic yields, and to interrelate the various parameters involved.

The factors on which guidance is required by the man practiced in the art are:

(1) selection of glass composition and heat treatment to obtain suitable phase separation;
(2) leaching and washing;
(3) stuffing;
(4) unstuffing where needed; and
(5) drying and consolidation.

The guidance given in steps (3–5) above applies to all matrices, not just those produced from a phase separated glass.

1. composition, time and temperature of heat treatment.

In order to achieve a satisfactory product it is necessary to choose a phase-separable composition, which on heat treatment at a particular temperature separates into approximately equal volume fractions, and when held at that temperature, develops an interconnective structure with a desirable pore size. A number of guidelines can be given to the man practiced in the art. We find it convenient to choose compositions from the area of alkali metal borosilicate glasses, and further guidance is given below as to suitable compositions.

Many compositions have been reported as suitable for use in the production of porous glasses for diverse purposes (see U.S. Pat. Nos. 2,272,342, 2,346,059, 3,859,073 and 3,831,640) usually not for strengthening purpose by a route based on phase separation and leaching of the soluble phase. We have discovered that for strengthening purpose, only small regions within prior art compositions ranges are suitable. U.S. Pat. No. 3,843,341 is one representative disclosure of such compositions which for the most part are not satisfactory. For example, a number of glasses from within the preferred region of U.S. Pat. No. 3,843,341 and from previous disclosures of Corning (see Table II below) were vertically drawn into 8 mm rods at a rate of one inch per minute. These were phase separated as disclosed herein, but all the Table II compositions cracked during leaching.

TABLE II

Prior Art Compositions which Crack upon Leaching*

| $Na_2O$ | $B_2O_3$ | $SiO_2$ | $Al_2O_3$ |
|---|---|---|---|
| 8 | 30 | 62 | 0 |
| 8 | 35 | 57 | 0 |
| 8 | 40 | 52 | 0 |
| 10 | 30 | 60 | 0 |
| 10 | 35 | 55 | 0 |
| 10 | 40 | 50 | 0 |
| 10 | 30 | 59 | 1 |
| 10 | 35 | 54 | 1 |
| 10 | 40 | 49 | 1 |

*All concentrations are in units of mol percent.

More specifically, we have found that (1) All of the compositions in the range of the sodium borosilicate system disclosed in U.S. Pat. No. 3,843,341 and drawn into rods as described above, cracked upon leaching. This includes the region denoted as the preferred range in said patent.

(2) Many of the compositions in the range of the sodium alumina borosilicate disclosed in U.S. Pat. No. 3,843,341 cracked when treated as described above. This was true even for compositions in the preferred range.

(3) Many of the preferred compositions disclosed in the U.S. Pat. No. 2,221,709 cracked when treated as described above.

Although we find most of the previously disclosed borosilicate range of composition unsatisfactory because of the requirements we need to insure a satisfactory yield of produce, we have discovered certain specific compositions in this broad range which are useful and which have not been previously described. In addition we have discovered a set of criteria which can be applied to identify other specific limited areas of phase-separable glass compositions which would give a satisfactory yield or product.

From a commercial point of view, and because of the large region of phase separation which they show it is most convenient to work with alkali borosilicate glasses though almost all silicate glassy systems exhibit composition regions of phase separation.

In order to achieve a satisfactory product it is necessary to choose a composition:

(1) which on suitable heat treatment separates into two phases, one silica-rich, the other silica-poor. The latter is preferentially soluble in a suitable solvent.

(2) which on heat treatment at a particular temperature separates into phases of approximately equal volume fractions and when held at that temperature develops interconnected microstructure.

(3) which is easy to melt and is easy to refine using conventional techniques.

(4) which is relatively easy to form and does not phase separate significantly during the forming stages.

The following provides a systematic procedure for selecting a suitable composition.

(1) Almost all silicate glassy systems exhibit composition regions of phase separation. However, of commercial interest are the alkali borosilicate glasses which show a large region of phase separation. The silica-poor phase of these glasses can be readily dissolved by simple acidic solutions. Frequently it is necessary to add other components such as aluminum oxide to modify certain properties of these glasses. However, some oxides are not desirable because on phase separation they end up in the silica-poor phase and make it difficult to dissolve by simple acidic solutions. Thus only those other components are suitable which do not diminish the solubility of silica-poor phase significantly.

(2) After deciding on the glassy system (along with dopants), one should next determine the immiscible regions of compositions, C, and their coexistence temperatures, Tp. Tp(C) is the temperature above which a glass (C) is homogeneous. Techniques for determining Tp are well described in literature (see for example W. Haller, D. H. Blackburn, F. E. Wagstaff and R. J. Charles, "Metastable immiscibility surface in the system $Na_2O-B_2O_3-SiO_2$" J. Amer. Ceram. Soc. 53 (1), 34–9 (1970)).

(3) We have discovered that one should determine those compositions, $C_1$, which exhibit an equilibrium volume fraction of about 50% at least at some heat treatment temperature. We shall denote this temperature by $To(C_1)$. The method for determination of this temperature is as follows:

(a) Select three (or more) temperatures, say $T_1$, $T_2$ and $T_3$ (about 50° apart from each other) such that $$T_3 < T_2 < T_1 < Tp(C_1)$$

Carry out long heat treatments on glass samples until they turn white at temperatures $T_1$, $T_2$ and $T_3$.

(b) by electron microscopy of these heat-treated samples measure volume fractions, V(T), of one of the phases (the same phase should be selected for all samples) for each of the samples.

(c) Make a plot of volume fraction V(T) against heat treatment temperature, T. By interpolation (or extrapolation) determine the temperature for which the volume fraction will be 50 ($\pm 5$)% (i.e., temperature $To(C_1)$).

(4) Knowing Tp(C) and $To(C_1)$, one should determine the composition range ($C_2$) within the range $C_1$ such that (a) 575° C $\geq$ To ($C_2$) $\geq$ 500° C and
(b) 750° C $\geq$ Tp ($C_2$) $\geq$ 600° C.

These temperatures are selected so as to give not over long heat treatment times; other ranges can of course be selected if one is willing to accept long heat treatment times of a week or more.

(5) The composition range, $C_2$, is further narrowed by the requirement that, during melting, it should be easily refinable. This demands that the high temperature viscosity of the melt should be sufficiently low. We shall call this sub-range of $C_2$, $C_3$ (i.e., all glasses belonging to $C_2$ which, in addition, refine properly). We have found for example that one convenient feature identifying some of the refinable glasses is that those containing at least 28% $B_2O_3$ refine satisfactorily.

(6) Not all compositions of $C_3$ are desirable even though they will refine easily, and will phase separate with 50% volume fraction. An additional requirement is that the desired composition should not phase separate significantly during forming operation. The degree of phase separation in the forming process is influenced by the viscosity characteristics of the glass in the region at and below the co-existence temperature, and also the dimensions of the articles being formed, and rate at which it can be cooled.

In order to determine those compositions, $C_4$, which do not appreciably phase separate upon cooling through and below the co-existence temperature, articles with wall thickness of the order of several mm are cooled at rates sufficiently low to prevent the build-up of large thermal stresses. The degree of phase separation occurring within these articles can then be determined. Those compositions within the area $C_3$ which do not phase separate in this forming process can then be grouped in the further restricted area $C_4$. The compositions fulfilling this condition preferably have a Tp between 710° and 600° C, most preferably between 695° and 640° C.

(7) The final criterion we apply insures that there is sufficient composition difference between the two phases when separated that leaching will take place effectively. For this purpose we select only those compositions C* which within the $C_4$ range satisfy the condition that $$Tp(C^*) - To(C^*) \geq 75° C$$

Having found the desired composition range C*, any composition, Co, can be selected. The suitable heat treatment temperature and time for this particular composition Co can then be found by the following procedure.

(a) The heat treatment temperature of Co is set equal to To(Co), i.e., the temperature at which the volume fraction of the two phases will be equal. If C* has been properly chosen according to the above criteria, this temperature will now be so low that the time needed to obtain a suitable microstructure for leaching would be too long and uneconomic. Similarly, it will now be too high otherwise

[1] distortion of the glass may occur during heat treatment;

[2] if the temperature of heat treatment is well above say, over 160 centigrade degrees above the glass transition temperature, phase separation tends to be rapid which reduces the degree of control on phase separation. These requirements limit our preferred heat treatment temperature, $T_H$, to the following range $$575° C > T_H(Co) = To(Co) > 500° C$$

(b) Having found $T_H(Co)$, the heat treatment time is determined by the condition that a microstructure state suitable for leaching is developed.

Heat treatments at different times are carried out say $t_1$(1 hour) $< t_2$(2 hours) $< t_3$(3 hours) . . . . By electron microscopy, it is possible to determine the time, $t_{max}$, beyond which the interconnectivity of the structure begins to break down. The size of the leachable phase is measured from micrographs, and the preferred heat treatment times are those which are less than $t_{max}$ but for which the microstructure size is at least 150 Å, and preferably less than 300 Å.

We have applied the above criteria within the alkali borosilicate system and have identified certain characteristics of the composition ranges which contribute to good yields of end products and particularly those having appreciable thickness, avoiding the problems arising from, e.g., phase separation during forming, or insufficient phase separation when the phase separation stage is being carried out. Phase separation during forming of the glass article from the melt, and insufficient phase separation or breakdown of the interconnective structure during the phase separation heat treatment can both cause or contribute to cracking during either or both of the following steps, leaching of the phase separated glass, drying of the leached and stuffed glass.

It has become clear to us that the compositions associated with the best yields are those contained within the following broad composition area (all percentages being in mol percent):

|                  | Broad    | Preferred  |
|------------------|----------|------------|
| $SiO_2$          | 48–64    | 49.5–59    |
| $B_2O_3$         | 28–42    | 33–37      |
| $R_2O$           | 4–9      | 6.5–8      |
| $Al_2O_3$        | 0–3      | 0–2.0      |
| ρ                | 0–1.0    | 0.20–0.8   |
| α                | 0–3      | 0–2.4      |
| λ                | 0–0.5    | 0          |
| x                | 0.1–1.0  | 0.2–0.8    | where α is the $Al_2O_3$ concentration in mole percent, $x = \rho + 1/3\alpha - \lambda$ and is defined as the ratio of $A_2O/R_2O$ for $A_2O$ and $R_2O$ in mole percent, $A_2O$ is the sum of the concentrations in mole percent of $K_2O$, $Rb_2O$ and $Cs_2O$; and $R_2O$ is the sum of the concentrations in mole percent of $Li_2O$, $Na_2O$, $K_2O$, $Rb_2O$, and $Cs_2O$; and λ is the ratio of $Li_2O/R_2O$.

Because the presence of $Al_2O_3$ in the glass significantly affects the results, we will first discuss glasses which have no $Al_2O_3$ content. Under these conditions, the ranges listed above are appropriate with $Al_2O_3$ content of zero, with $R_2O$ the sum of all the alkali metal oxides $Li_2O$, $Na_2O$, $K_2O$, $Rb_2O$ $Cs_2O$ and the broad range for ρ limited between 0.1 and 1.0. If the concentration of $K_2O$ is zero, then the upper limit of the range of ρ should be 0.8.

Lithium glasses tend to devitrify and therefore it is often preferable not to use that chemical. In this case, $R_2O$ becomes the sum of the concentrations of $Na_2O$, $K_2O$, $Rb_2O$ and $Cs_2O$. All limits and conditions above are maintained.

Rubidium and cesium glasses are more expensive than those made with sodium and potassium. They can be left out for economic reasons. Then $R_2O$ becomes the sum of $Na_2O$ and $K_2O$. All limits and conditions above are maintained.

When more than 0.5 mole percent $Al_2O_3$ is present in the glass, the broad range of $R_2O$ is taken between 6 and 9 mole percent.

The most economically favorable compositions with $Al_2O_3$ consist of $R_2O$ having $Na_2O$ and $K_2O$ only, or $R_2O$ can also consist of $Na_2O$ only.

The glasses below in Table III are glasses which we have identified using the above criteria and found satisfactory for use in the molecular stuffing process of the present invention as we achieve a satisfactory control of phase separation and pore structure after leaching using these compositons, and a good overall yield of finished product of the invention.

TABLE III

| | SiO$_2$ | B$_2$O$_3$ | Na$_2$O | K$_2$O | Rb$_2$O | Cs$_2$O | Al$_2$O$_3$ | p | α | λ | x | Tp |
|---|---|---|---|---|---|---|---|---|---|---|---|---|
| I | 63 | 30 | 5 | 2 | 0 | 0 | 0 | 0.29 | 0 | 0 | 0.29 | — |
| II | 63.7 | 29.4 | 0.6 | 0 | 0 | 0 | 0 | 0.10 | 0 | 0 | 0.10 | — |
| III | 61.2 | 34 | 2 | 2.8 | 0 | 0 | 0 | 0.58 | 0 | 0 | 0.58 | 646 |
| IV | 60.7 | 35.1 | 2 | 2.2 | 0 | 0 | 0 | 0.52 | 0 | 0 | 0.52 | — |
| V | 59.7 | 33 | 5.4 | 1.9 | 0 | 0 | 0 | 0.26 | 0 | 0 | 0.26 | 678 |
| VI | 59.3 | 34.3 | 1.6 | 4.8 | 0 | 0 | 0 | 0.75 | 0 | 0 | .75 | 633 |
| VII | 58.4 | 34 | 5.6 | 0 | 2 | 0 | 0 | 0.26 | 0 | 0 | 0.26 | 687 |
| VIII | 59.1 | 34 | 4.9 | 0 | 0 | 2 | 0 | 0.29 | 0 | 0 | 0.29 | 687 |
| IX | 57.7 | 35 | 5.7 | 0 | 0 | 0 | 1.6 | 0 | 1.6 | 0 | 0.53 | — |
| X | 56 | 36 | 4 | 4 | 0 | 0 | 0 | 0.50 | 0 | 0 | .50 | 670 |
| XI | 56 | 36 | 6 | 2 | 0 | 0 | 0 | .25 | 0 | 0 | .25 | 710 |
| XII | 53 | 38 | 8 | 0 | 0 | 0 | 1.0 | 0 | 1.0 | 0 | .33 | 681 |

Another aspect of our invention involves leaching of borosilicate phase separable glasses. We prefer before leaching the glass to etch the article to be leached with dilute hydrofluoric acid for about 10 seconds to remove any surface contamination, or surface layer of glass having a slightly different composition from the interior due to volatilization of components such as B$_2$O$_3$ or Na$_2$O during formation.

The concentration of the acid solution, amount of leaching solution and temperature of leaching have a direct bearing on the progress of leaching. It is essential to insure that a sufficient quantity of the leaching solution is brought into contact with the article to dissolve the soluble phase. The rate of leaching may be conveniently controlled by adjusting the temperature. The glass should be above 80° C, preferably above 90° C. As has previously been described in U.K. 442,526, it is desirable to use an acid solution which has been saturated with NH$_4$Cl or other equivalent compounds capable of reducing the concentration of water in the acid leaching solution. This assists in controlling any swelling of the treated layer and reduces considerably the chances of loss due to cracking of the article, as the inner untreated layer goes into tension because of the thickness of the swollen outer layer.

We have found that the rate of leaching, and the redeposition of borates in the pores of the glass during leaching can be controlled by controlling the concentration of borate salts in the acid leaching solution.

We have measured leaching rates at 95° C for glass rods (length 10 cm, diameter 8 mm, and composition 57% SiO$_2$, 35% B$_2$O$_3$, 4% Na$_2$O and 4% K$_2$O) heat treated for 1¾ hours at 550° C with leaching solutions containing 327.3 gm of NH$_4$Cl, 33.6 ml of HCl per liter of water and varying amounts of B$_2$O$_3$. We found that leaching time increased with increasing B$_2$O$_3$ content in the leaching solution. The results are summarized below:

TABLE IV

| Amount of Boric Acid (g/liter) | Leaching Time (minutes) |
|---|---|
| 0 | 425 ± 50 |
| 41.2 | 625 ± 50 |
| 61.5 | 642 ± 50 |
| 84.7 | 725 ± 50 |
| 106.1 | 1670 ± 50 |

We believe redeposition of borates in the pores also contributes to breakage. This can be avoided by e.g. replacing the leaching solution as the concentration of borate builds up. But this requires large quantities of leaching solution. For example, in order to leaching time to be no more than 660 minutes, the volume of leaching solution per 100 ml of glass will be on the order of 1550 ml. This, however, can increase costs and provide a possible source of contamination. We find it more convenient to provide a cold trap so that excess material is continuously removed from the solution as it come into solution from the article being leached. The cold trap is effective in speeding the process even if it is only a few degrees below the temperature of the glass article. Preferably it should be 20° C below the temperature of the glass article. We find it convenient when NH$_4$Cl is present to choose a temperature for the cold trap at which the acid solution remains saturated with NH$_4$Cl. It is possible to operate with a low level of rod breakage without NH$_4$Cl or other equivalent compounds present in the leaching solution. In general we prefer to use at least 10 weight percent NH$_4$Cl, preferably 20 weight percent as we find that on a statistical basis there is an even lower level of rod breakage when NH$_4$Cl is present.

The most convenient way to determine the suitable leaching time is to take an article and subject it to the leaching treatment measuring the mass of the article at intervals of time until little or no further weight loss is observed.

The article, once leached, is conveniently washed with deionized water, with certain compositions there can be deposition of silica gel in the pores, and we find this can be removed by washing with NaOH. We have found it possible by selection of compositions to minimize this deposition. The compositions shown in Table III alleviate this problem, especially those with minimum silica.

Once the porous matrix has been produced, either from a phase-separable glass as outlined above, or by, e.g., a chemical vapor deposition technique, the selection of suitable conditions for stuffing and unstuffing we have found can be made by following the guidelines given below.

The dependence of T$_g$ or expansion coefficient on dopant and dopant compound concentration can be determined by literature search or by suitable experiments. From these, an optimum concentration of dopant or dopant compound added in the article is determined. Sufficient dopant or dopant compound must then be dissolved in the stuffing solution so that the desired concentration is reached at a particular stuffing temperature and time of stuffing. The following procedure enables these parameters to be determined:

(1) Determination of Stuffing Temperature of Porous Articles
  (a) Determine the dependence of the solubility of the dopant or dopant compound in the appropriate solvent on temperature,
  (b) The stuffing temperature range lies between the temperature at which the desired concentration of dopant or dopant compound is saturated in solution from (a) and the boiling temperature of the solution.

(2) Determination of Stuffing Time of Porous Articles

The stuffing time depends not only on the concentration, temperature, and the composition of dopant solution, but also on the microstructure size in the porous article. The procedure given here is for a given set of dopant solution, temperature and microstructure of rod shaped articles. For a change in any of these variables, the procedure should be repeated, or suitably modified according to our guidelines.

(a) Measure the diamter ($a_o$) of a porous rod and immerse it in the dopant solution.
(b) Monitor its weight as a function of time.
(c) Determine the time, $t_o$, beyond which the weight does not increase significantly by plotting the fractional weight change, $y(t) = [M(t) - M(o)]/[M(\infty) - M(o)]$ versus time, $t$, where $M(o)$, $M(t)$, and $M(\infty)$ are the respective weights initially, at time $t$ and at infinity (very long times).
(d) Time required to stuff, $t$, another porous rod of diameter $a$, with the same dopant solution at the same temperature is $$t = t_o [\frac{a}{a_o}]^2$$

EXAMPLE

Figure 6:
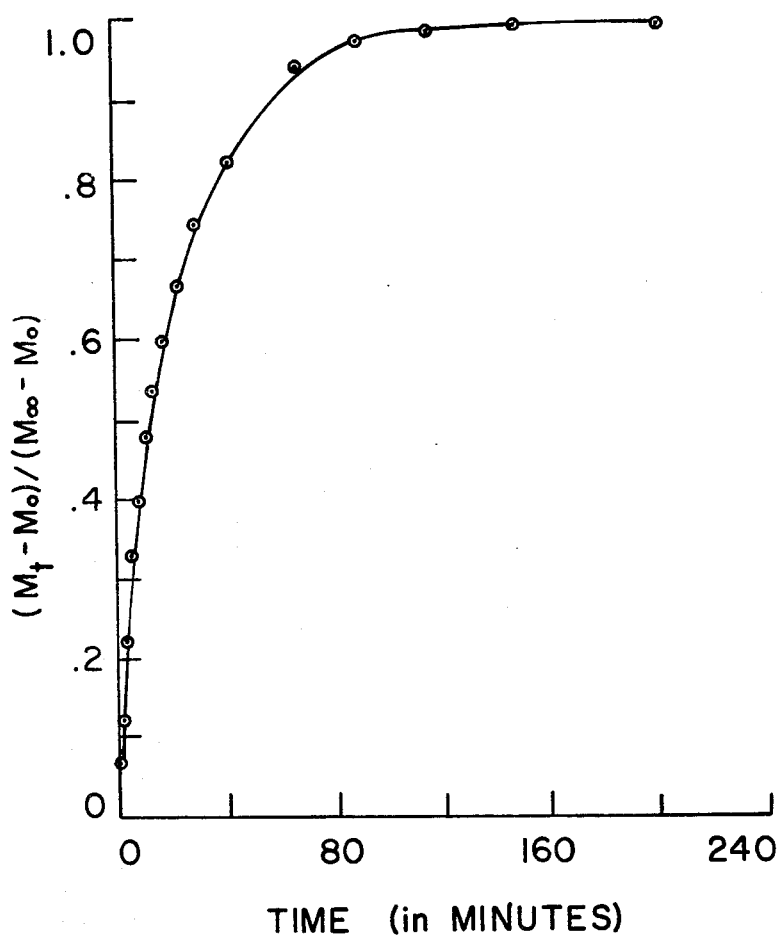
FIG. 6 shows a plot of normalized weight loss versus time for unstuffing with water at 100° C) a rod originally stuffed with $CsNO_3$ solution at 100° C.

We stuffed a porous rod with a concentrated solution of $CsNO_3$ in water (120 g $CsNO_3$ per 100 ml of solution) at 100° C. The radius of the rod was 0.42 cm. We measured the weight gain as a function of time. The results are shown in FIG. 6. It can be seen that after about 200 minutes the weight of the rod does not increase significantly. Thus, the proper stuffing time for this rod is about four hours.

(3) Determination of Unstuffing Time to Produce a Continuous Profile in a Porous Article by Thermal Precipitation To produce a continuous profile, the stuffed article, produced as (2) above, is partially unstuffed by immersing it in the solvent. This should be done at a temperature where the dopant does not precipitate. The unstuffing procedure depends on the temperature, microstructure and composition profile desired. For example, the procedure described here is for a given temperature of stuffing and parabolic profile.

(a) Carry out an unstuffing study at the temperature at which the rod was stuffed by monitoring the weight change as a function of time while the rod is immersed in solvent.
(b) Plot the fractional change $y(t)$ $$y(t) = \frac{M(t) - M(o)}{M(\infty) - M(o)} \quad (1)$$

against time $t$.

(c) The time of unstuffing, $t_o$, depends on the desired profile; often it is $$\tfrac{1}{4} \geq y(t_o) \geq \tfrac{3}{8}$$

For profiles of other shapes, a similar formula for $y(t_o)$ can be worked out.

EXAMPLE

We chose a porous rod stuffed with concentrated $CsNO_3$ solution (120 g $CsNO_3$ per 100 ml solution) at 100° C as described above. We then unstuffed the rod in water at 100° C monitoring its weight loss as a function of time. The results are shown in FIG. 6. The range of unstuffing times can be calculated from the graph.

(4) Determinatio of Unstuffing Temperature and Time to Produce a Step Profile by Thermal Precipitation The temperature for unstuffing for a step profile depends on the strength desired in the article and on the dopant solution. Since one would like to have as low an expansion coefficient (or high $T_g$) in the surface layer as possible, the unstuffing temperature is typically a few degrees above the freezing point of the dopant solution.

The time required for unstuffing depends on the desired thickness of the surface layer to be put in compression, as well as on such parameters as temperature of unstuffing, the concentration of the stuffing solution previously used, and the size of microstructure in the porous article. The procedure described here is for a given set of these variables. In case of a change in the values of any of these parameters, the entire procedure should be repeated, and adjusted according to the guidelines herein.

Suppose the desired surface layer thickness is "$d$" and the thickness of the article wall is "$a$". Let $$Y = 4\frac{d}{a}[1 - (\frac{d}{a})g];$$

where $g$ is a geometric factor, $g = 1$ for cylindrical shapes; $g = 0$ for plates. Knowing Y, it is possible to determine the proper unstuffing time by following the procedure described below.

(a) Carry out an unstuffing study in the desired solution at the desired temperature by monitoring the fractional weight change $y(t)$ as a function of time.
(b) Plot the fractional weight change against time, (see Eq. 1).
(c) Find time $t_o$ for which $$y(t_o) = Y$$

from the above plot. This is the desired unstuffing time.

The practical application of the use of the unstuffing procedure is in most cases to reduce the concentration of dopant in the outer layers of the article so as to attain a desired strengthening profile.

This can be done as indicated above by, e.g., when the actual stuffing has been completed with a saturated solution of a dopant at 95° C, replacing the dopant solution by the solvent used free of dopant at the same temperature, or where the system is aqueous, water or dilute nitric acid. The dopant then tends to diffuse outwards, thus varying the concentration through the cross-sectional area of the porous matrix. The time required for this "unstuffing" is of course dependent upon the volume being treated, but an article of wall thickness 8 mm requires about 20–30 min. We prefer to stop the unstuffing by replacing the liquid surrounding the rod with cold solvent, or in the case of an aqueous system, water at a temperature approaching freezing point or ice-cold nitric acid. In the case of an aqueous system we have also found it possible to control the end point by measuring the change in conductivity of the water being used to unstuff.

(5) Drying, i.e., Removal of Solvent

Two problems occur in drying which affect the economics of the process and the quality of the product. These are cracking of the porous glass structure and changes in the dopant composition profile. Cracking is a statistical problem and it is possible to have samples survive the process regardless of the drying procedure. However, in order to operate on a commercial scale, it is necessary to adopt a procedure which minimizes cracking and thus improves the economics of the process. Such a procedure should also preferably avoid profiles being altered in such a way that dopant is transferred from the interior of the article toward the surface as this is not usually a desirable profile. This results in a depression of dopant concentration in the center and an increase near the edges. As indicated above, the profile obtained is dependent on the unstuffing. Having achieved a suitable profile with solvent still present in the porous structure, it is essential to dry, i.e., remove solvent in a way which will not alter the profile to an undesirable state.

In an analysis of the drying process we have found that a number of events affect the process. These are:

(a) Gas evolution. The sources of gases can be the solvent, dopant decomposition products and dissolved gases. If the gas evolution is too fast because of rapid heating or insufficient gas removal the resulting differential pressures in the pores can break the glass and/or carry dopant from inside of the article.

(b) Size change. As the bulk of the solvent is removed from the porous glass, a solvent layer may remain chemically bonded to the surface of the porous glass. We have observed this effect with water and found the layer to persist up to high temperatures. This may also occur with other solvents. As this layer is removed, the sample shrinks. With sufficient shrinkage difference across the porous structure, stresses can be developed to the point of cracking.

(c) Dopant compound decomposition. The dopant as available in solution is generally a compound which thermally decomposes. We have chosen dopant compounds which decompose before the collapsing temperature. This decomposition step is generally accompanied by a large evolution of gases. It is generally desirable to control the heating rate while going through the temperature range where decomposition occurs in order to prevent cracking and transport of dopant.

(d) Mass transport can occur at several stages in the drying process. When the article is dried initially, dopant which remains in solution can be transported to the surface and deposited there as the solvent is evaporated. If the solvent evaporates violently or boils even precipitated dopant can be displaced. After decomposition, if the dopant crystals are small, they may be carried through the gas phase. If the dopant has a significant vapor pressure, dopant redistribution through the vapor phase may occur. If dopant becomes a liquid it may redistribute according to gravity.

Outlined below is a preferred process for the suitable solution of these problems. The initial bulk removal of the solvent has to be performed by the use of conditions where boiling does not occur; in the case of aqueous solutions, we have used two procedures. One consists of initially drying the porous glass articles with precipitated dopant in a dessicator (at atmospheric pressure) for 24 hours at 22° C and then placing them in a drying oven. The second consists of placing the article under vacuum at temperatures below 10° C and above the freezing point of the solution. We have found 4° C for 24 hours to be convenient when using $CsNO_3$ in aqueous solution as a dopant. In order to minimize the chances of cracking even further, we find that when using aqueous solvents, it is convenient to subject the article to a final wash with a non-aqueous solvent which is non-reactive with the glass. An example of a suitable solvent is methyl alcohol.

We have found it preferable to warm the articles which have been maintained below 10° C under vacuum slowly to room temperature and to maintain under vacuum at room temperature conveniently for about 24 hours before the articles are transferred to a drying oven.

In the case of non-aqueous solutions of dopants, we have found it suitable to place the articles under vacuum at room temperature for 24 hours and then transfer to a drying oven. This significantly speeds up the process as compared to an aqueous process.

In the drying oven, we have found it desirable to heat the samples to an upper drying temperature under vacuum at a rate below 30° C/hour, preferably 15° C/hour, since a slow heating rate significantly lowers the cracking probability and avoids dopant redistribution.

The selection of a suitable slow heating rate will be dependent on the economics of the process. It may in some circumstances be cost effective to accept a higher breakage rate in order to increase the rate of throughput of articles through a processing system. However, any increase in heating rate must also be balanced against the increased risk of destroying the desired strengthening profile in the articles which are not cracked.

The upper drying temperature depends upon the porous glass matrix. It is determined by the fact that it should not be too high for the pores to collapse and it should not be too low, otherwise the drying rate will be too low to be economically useful. A suitable value can be found by first collapsing an undoped article and measuring its glass transition temperature, $T_g$. The upper drying temperature is then preferably chosen to be in the range between 50° and 150° C below the glass transition temperature. We prefer to use a narrower range of 75° to 125° C.

The next stage of drying consists of holding the glass at or about this upper drying temperature for periods of 5 to 200 hrs., preferably 40–125 hrs. In this period, the glass may be held under vacuum or under a selected gas atmosphere depending on the optical properties (such as color absorption spectra) desired in the final product. At the upper drying temperature one may use either reducing or oxidizing atmospheres in order (i) to control the valence states of multiple valence ions, particularly the transition metal ions, and (ii) to control the valence states (either metallic or ionic) of the noble metals. For example, $Cu^{2+}$ gives blue color, $Cu^+$ is red and Cu gives brown color. We have found it desirable to pass gas around the article since this helps the drying process. If the reduction of hydroxyl concentration is unimportant, this holding period can be eliminated. The reduction of proton concentration (or moisture content) leads to (i) increased transmission in the infrared over long wavelengths, (ii) increased ultraviolet transmission and (iii) low d.c. conductivity and low a.c. loss. In our preferred procedure, we heat treat a porous glass article having a $T_g$ of 725° C at 625° C (100° C below the glass transition) for 96 hrs. while passing dry oxgen gas around the sample.

(6) Consolidation

Once the above drying process is complete, the article is now ready to be collapsed. The article is raised rapidly in temperature to the point where consolidation occurs. Once the pores are collapsed, consolidation is complete and the article is quenched to room temperature. The consolidation step must be conducted at atmospheric pressure or below if the article is to be further worked by reheating above the consolidation temperature otherwise some gas evolution is likely to occur in reheating and bubbles are formed.

We have found it desirable where the matrix is produced from a phase-separable glass to heat the porous glass samples under a reduced pressure (approximately 1/5 bar) up to 825° C were consolidation occurs.

The following examples illustrate the molecular stuffing aspect of the invention but do not limit the invention. Examples I to V illustrate the use of various concentrations of dopant in aqueous solutions in treating a porous matrix which result in a glass on consolidation with differing overall concentrations of dopant. The general procedure used for producing the porous matrix from a phase-separable glass and the subsequent treatment are shown in the paragraphs below and the actual numbered examples illustrate the use of different dopants at a range of concentration, collapsing temperatures and final overall glass composition.

Melting and Forming

A glass having the composition in mol%, 4 $NaO_2$, 4 $K_2O$, 36 $B_2O_3$, 56 $SiO_2$ was melted and stirred to produce a homogeneous melt from which rods were drawn having a diameter in the range 0.7 to 0.8 cm., using a cooling coil.

Heat Treatment

The drawn rods were heat treated at 550° C for 2 hours to cause phase-separation.

Etching before Leaching

Each rod was etched for 10 seconds in 5% HF followed by a 30 second wash in water.

Leaching

The rods were leached at 95° C with 3N HCl containing 20% $NH_4Cl$ by weight, the time being chosen on the basis of previous trials so as to reach a stage where the rate of weight loss has dropped to almost nil. The leaching time of the rods used in these examples was chosen to be in excess of 30 hours. During leaching, by providing a cold spot at 40° C, the boric acid concentration in the leaching agent was kept below 50 g/liter, thus speeding up leaching and avoiding possible re-deposition of boron compounds in the pores of the matrix. 40° C is chosen so that there is no precipitation of $NH_4Cl$ from the leaching solution as this temperature is above the saturation temperature of the $NH_4Cl$ present to maintain a suitable amount in solution to reduce breakage drastically.

Washing

The leached material is washed with de-ionized water. The washing cycle is conveniently controlled by determining the concentration of iron in the effluent. Washing is conveniently carried out at room temperature using 10 volumes of water to 1 volume of glass. We prefer in a non-continuous process to change the water about 6 to 8 times, giving a washing time of about 3 days.

Stuffing

With aqueous solutions of dopants (see Examples I to V below) we prefer to move smoothly from the last washing stage to stuffing by simply replacing the water by the stuffing solution. This is done by draining the water from the last wash and filling the tube containing the porous rod with stuffing solution.

In Examples I through IV, the samples were removed from the stuffing solution and cooled to 22° C where the dopant precipitated partially with an amount equivalent to its aqueous solubility at 22° C remaining in solution in the liquid filling the pores. (For example, 10 g Ba($NO_3)_2$/100 ml solution remained dissolved in water in the pores after thermal precipitation to 22° C. Similarly, 6 $H_3BO_3$/100 ml solution remained dissolved in water in the pores.) The remainder of the dopant was precipitated during the drying procedure which was commenced by placing the porous article in an atmospheric pressure dessicator for 24 hours at 22° C. Drying was then continued under vacuum in a furnace whose temperature was raised at 15° C/hour to the upper drying temperature (as described above). This is determined in the manner described above and for the samples used in Examples I and VIII was 625° C.

Hold Time

The rods were then held at a temperature of 625° C for 96 hrs. while passing dry oxygen gas around the rods.

Consolidation

On completion of the hold time, the temperature of the rods was raised rapidly to a high temperature (given in each example) where collapsing took place under a reduced pressure of oxygen (approximately 1/5 bar).

In Example I, BaO is used as dopant. It is immiscible with the base glass at the collapsing temperature and causes the glass to become opalescent provided that it is not reworked at higher temperatures. In Example II, $B_2O_3$ is used as dopant. $B_2O_3$ reduces the glass transition temperature and hence is desirable for strengthening using the $T_g$ method. In example 3, PbO is used as dopant. PbO decreases the glass transition temperature and increases the expansion coefficient.

EXAMPLE I

| Rod | Dopant gms/100cc of $H_2O$ | Stuffing Time: Hours | Details Temp. ° C | Consolidation Temp. ° C | Composition Mole % | Wt% |
|---|---|---|---|---|---|---|
| 1 | 12 | 4 | 85 | 820 | 6.0 $B_2O_3$ 93.11 $SiO_2$ .82 BaO | 6.86 91.10 2.04 |
| 2 | 18 | 4 | 85 | 820 | 6.0 $B_2O_3$ 92.73 $SiO_2$ 1.22 BaO | 6.79 90.18 3.03 |
| 3 | 24 | 4 | 85 | 830 | 6.00 $B_2O_3$ | 6.72 |

Molecular Stuffing with BaO Dopant Ba($NO_3)_2$ in Water

-continued

| Rod | Molecular Stuffing with BaO Dopant Ba(NO₃)₂ in Water | | | | | |
|---|---|---|---|---|---|---|
| | Dopant gms/100cc of H₂O | Stuffing Time: Hours | Details Temp. °C | Consolidation Temp. °C | Composition Mole % | Wt% |
| | | | | | 92.35 SiO₂ | 89.28 |
| | | | | | 1.62 BaO | 4.01 |

EXAMPLE II

| Rod | Molecular Stuffing with B₂O₃ Dopant H₃BO₃ in Water | | | | | |
|---|---|---|---|---|---|---|
| | Dopant gms/100cc of H₂O | Stuffing Time Hours | Details Temp. °C | Consolidation Temp. °C | Composition Mole % | Wt% |
| Comparison Rod | 0 | — | — | 820 | 6.09 B₂O₃ 93.88 SiO₂ | 7 93 |
| 4 | 12 | 4 | 85 | 815 | 7.73 B₂O₃ 92.27 SiO₂ | 8.83 91.17 |
| 5 | 18 | 4 | 85 | 815 | 8.51 B₂O₃ 91.49 SiO₂ | 9.71 90.29 |
| 6 | 24 | 4 | 85 | 810 | 9.28 B₂O₃ 90.72 SiO₂ | 10.58 89.42 |

EXAMPLE III

Molecular Stuffing with PbO + B₂O₃ Dopant Pb(NO₃)₂ and H₃BO₃ in Water

Rod No. 7

Doped with 40 gms Pb(NO₃)₂ and 10 gms H₃BO₃ per 100 cc of H₂O at 85° C for 12 hours. Collapsed at 825° C.

EXAMPLE IV

Molecular Stuffing with BaO + B₂O₃ Dopant Ba(NO₃)₂ and H₃BO₃ in Water

Rod No. 8

Doped with 12 gms Ba(NO₃)₂ and 6 gms H₃BO₃ per 100 cc of H₂O at 85° C for 4 hrs. Collapsed at 830° C.

EXAMPLE V

Figure 7:
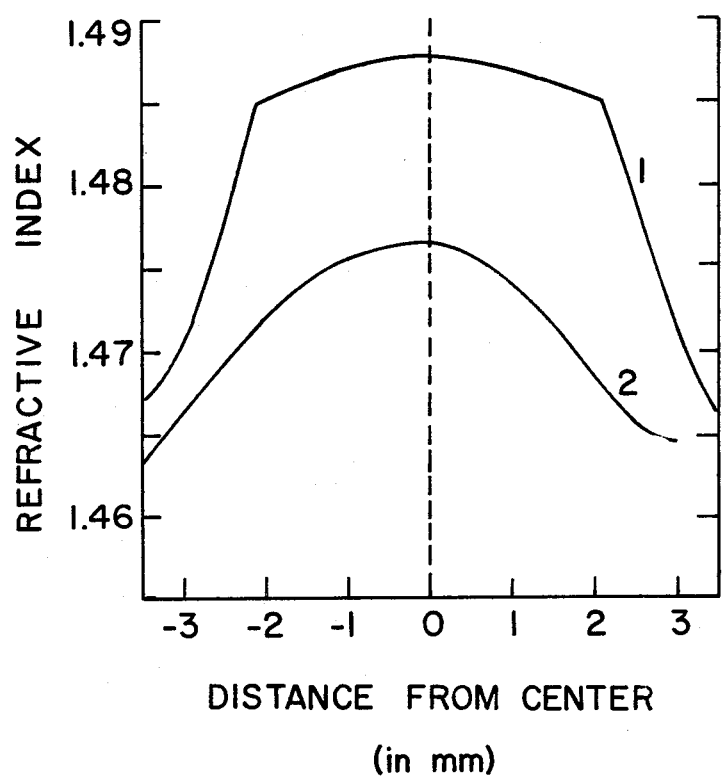
FIG. 7 shows composition profiles measured in terms of refractive index distribution, for two rods unstuffed at 95° C for periods of 11 (Curve 1) and 20 (Curve 2) minutes respectively.

The above examples all relate to uniform doping of a rod. As described above, it is possible once a rod has been left for sufficient time to diffuse the dopant solution into the pores, to then reduce the concentration in the outermost part of the rod so as to achieve a composition profile in the collapsed rod. Two porous rods were produced by the procedure outlined above, and were immersed for more than 4 hours at 95° C in an aqueous solution of CsNO₃ with a concentration of 120 g CsNO₃/100 ml solution. The rods were then transferred to water at 95° C, and left in the water for periods of 11, and 20 minutes respectively. Each rod at the expiration of the time in water was immersed in water at 0° C for 10 minutes to cause thermal precipitation of CsNO₃. The rods were then treated to remove solvent and collapsed in the manner described above. The composition profiles as measured by refractive index are shown in FIG. 7.

EXAMPLE VI

Several porous rods produced by the method described above were immersed in a series of solutions of CsNO₃ and Cs₂CO₃ as described in Table V below for more than four hours at 95° C. These were then unstuffed to produce a step profile. The time required for unstuffing was determined using FIG. 6 (i.e., for rod #13 the time for which $y(t_o) = 0.50$ is 300 min.). The stuffed rods were unstuffed by immersion in ice water for 300 min. and the water was removed and rods were collapsed as described above. The resulting Cs₂O concentration measured in terms of refractive index, in the center of the rod, is listed in Table V.

TABLE V

| Rod Number | Stuffing Solution | Index at center of rod |
|---|---|---|
| 9 | 20 grs Cs₂CO₃/100ml H₂O | 1.462 |
| 10 | 30 grs Cs₂CO₃/100ml H₂O | 1.475 |
| 11 | 75 grs Cs₂CO₃/100ml H₂O | 1.488 |
| 12 | 60 grs CsNO₃/100ml aqueous solution | 1.475 |
| 13 | 120 grs CsNO₃/100ml aqueous solution | 1.486 |

EXAMPLE VIII

Figure 8:
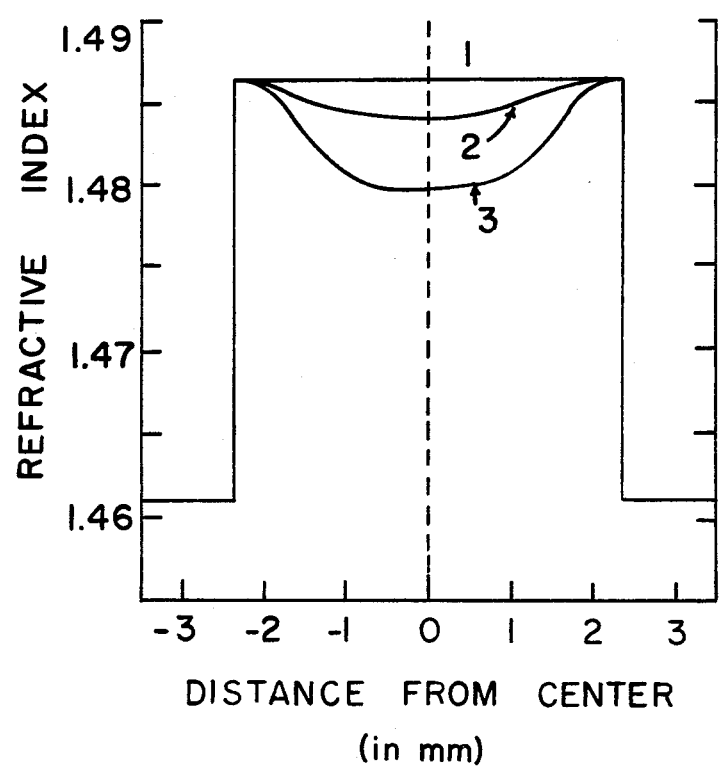
FIG. 8 shows composition profiles measured in terms of refractive index distributions for stuffed rods heated under vacuum at rates of (Curve 1) 15, (Curve 2) 30 and (Curve 3) 50° C/hour respectively.

As discussed previously, we emphasized the importance of drying at a slow rate between temperatures near 20° C and 600° C when using rods stuffed with dopants. Here we show an example of differences in composition profiles due to different heating rates. Several stuffed porous rods as used in Example V were unstuffed to produce stepped profiles as in Example VI. After thermal precipitation, the rods were dried under vacuum at 4° C for 24 hours. They were then heated under vacuum at rates of 50, 30 and 15° C/hr respectively. The resulting composition profiles measured in terms of refractive index profiles are shown in FIG. 8. Heating at rates above 100° C/hr caused appreciable breakage in the rods.

EXAMPLE VIII

After leaching and washing as described above in the introduction to Examples I-IV, a porous rod is immersed for 4 hours in a solution containing 120 g of Cs(NO₃) per 100 cc of water. It is then dried in a dessicator for 24 hours at room temperature. The sample is uniformly stuffed and in order to introduce a profile, it is then washed at 4° C in water for two hours and then in 3N HNO₃ for 30 minutes. This is followed by drying in a vacuum at the same temperature. Once the bulk of the water is removed, it is slowly dried by progressively raising the temperature as described in our preferred procedure. At intermediate temperatures, the $CsNO_3$ decomposes into $Cs_2O$ and various nitrogen oxides. When the sample changes from white to clear, the consolidation is complete and the sample is removed from the furnace. When analyzed at room temperature, the sample has a surface stress in excess of 10,000 psi and an expansion coefficient of $3.1 \times 10^{-6}/°C$ and a use temperature in excess of 700° C. The thickness of the compressive layer is over 20 mils. This final rod is stronger than a similar one made of fused silica.

EXAMPLE IX

As indicated above, it is possible to vary widely the choice of dopant, solvent and conditions of operation during stuffing and unstuffing and the combinations and permutations of these parameters in order to achieve a desired end result, or modification of processing conditions. We have given guidance to the man practiced in the art; this example illustrate some of the permutations and combinations we have found satisfactory. The porous rods used were all produced by the general procedure described above and solvent removal and heating carried out under our preferred conditions.

The results obtained are given below in Table VI. The columns in this table give the following information:

| | |
|---|---|
| | dopant distribution in matrix. By causing further precipitation before solvent removal begins so as to enable a more thorough decrease in dopant concentration near glass surface. |
| Column 8: | Temperature in ° C and time taken for adjusting dopant distribution by further solvent treatment. |
| Column 9: | Indicates temperature at which drying commenced in ° c, and by "V" or "A" whether drying in vacuum (V) or in dessicator at atmospheric pressure (A) for the first stage. |
| Column 10: | Gives the composition in terms of the index of refraction where measured. |

In the table,

| | |
|---|---|
| Line 1: | is the same as Rod #13 in Example VI above and is included for comparison with line 2, where by including a further treatment with methanol and water, while using the same stuffing solution, the difference in index is increased. |
| Line 3: | demonstrates how by replacing one compound by another, in this case $CsNO_3$ by $Cs_2CO_3$ because of higher solubility, stuffing can be carried out at room temperature. |
| Lines 4–9: | illustrate the use of different dopant and solvent combinations. |
| Lines 10 & 11: | show the use of a mixture of dopants. |
| Line 12: | illustrates the use of neodymium nitrate as a dopant, and of the use of an organic solvent. Doping with neodymium (or other transition elements) can be used to produce colors in the strengthened article. |

TABLE VI

| | Stuffing | | | Precipitation | | | | Drying | |
|---|---|---|---|---|---|---|---|---|---|
| 1 | 2 | 3 | 4 | 5 | 6 | 7 | 8 | 9 | 10 |
| Dopant | Weight per 100 ml solution | Solvent | Temp. & time | Solvent A | Temp. & time | Solvent B | Temp. & time | commence at (° C) | Index of Refraction |
| 1. $Cs(NO_3)$ | 120 g | water | 95° C-16 hr | water | 0° C-3 hr | — | — | 4° C(V) | center 1.486 edge 1.464 |
| 2. $Cs(NO_3)$ | 120 g | water | 95° C-16 hr | water | 0° C-3 hr | 30% water 70% methanol | 0° C-3 hr | 4° C(V) | center 1.489 edge 1.458 |
| 3. $Cs_2(CO_3)$ | 50 g | water | 22° C-16 hr | 92% meth. 8% 1-propanol | 22° C-3 hr | 52% methanol 48% 1-propanol | 22° C-3 hr | 22° C(V) | 1.487 |
| 4. $Na(NO_3)$ | 17.5 g | water | 25° C-4 hr | — | — | — | — | 25° C (A) | 1.465 |
| 5. $H_3BO_3$ | 18 g | water | 85° C-4 hr | water | 22° C 10 min | — | — | 22° C(A) | 1.457 |
| 6. $Pb(NO_3)_2$ | 40 g | water | 22° C-16 hr | 30% $H_2O$ 70% methanol | | 5% water 95% methanol | 22° C-3 hr | 22° C(V) | 1.465 |
| 7. $La(NO_3)_3$ | 50 g | ethanol | 22° C-16 hr | 15% ethanol* 85% diethyl ether | 22° C-3 hr | 10% ethanol* 90% diethyl ether | 22° C-3 hr | 22° C(V) | |
| 8. $Ba(NO_3)_2$ | 24 g | water | 85° C-4 hr | water | 22° C-3 hr | — | — | 22° C(A) | |
| 9. $Al(NO_3)_3$ 9 $H_2O$ | 60 g | water | 25° C-4 hr | — | — | — | — | 22° C(A) | + |
| 10. $Ba(NO_3)_2$ + $H_3BO_3$ | 12 g 6 g | water | 85° C-4 hr | water | 22° C-10 min. | — | — | 22° C(A) | + |
| 11. $Pb(NO_3)_2$ $H_3BO_3$ | 40 g 10 g | water | 85° C-12 hr | water | 22° C-10 min. | — | — | 22° C(A) | + |
| 12. $Nd(NO_3)_3$ | 20 g | 90% diethyl ether 10% ethanol | 22° C-16 hr | diethyl ether | 22° C-3 hr | — | — | 22° C(A) | 1.464 |

*In this case the stuffed rod was immersed in solution B for 1 ½ hr, then in solutions A & B for 3 hrs. respectively.
+ These glasses scattered light when collapsed and turned clear when pulled into fibers.

| | |
|---|---|
| Column 1: | Dopant used. |
| Column 2: | Concentration of dopant/100 ml solution. |
| Column 3: | Solvent, i.e., solvent used for intital stuffing. |
| column 4: | Temperature in ° C, and time taken for initial stuffing. |
| Column 5: | Solvent A--this is the solvent used to reduce the concentration and produce composition variation, and also to cause precipitation of the dopant. |
| Column 6: | Temperature in ° C and time taken for precipitation and variation in composition profile. |
| Column 7: | Solvent B is used where appropriate to adjust |

Articles in the shape of a rod can be strengthened by this invention.. Such strengthened rods can be used as preforms for pulling strong fibers to be used as reinforcement materials.

If a flat sheet of glass is strengthened by this invention, this sheet can be used as a window which can withstand large gradients in temperature (as caused by sun loading) and simultaneously reasonable pressure differentials across it as caused, for example, by high winds.

Molded sheets of this material can be used as stove tops since it would withstand the thermal shock of the heating element as well as the mechanical shock of abuse and wear.

An advantage of this invention over the thermal tempering method of strengthening glass is the ease with which it can be cut after strengthening. This is so because the center tension can be kept much lower than in thermal tempering for equivalent surface compression. The reason for this is the improved control of the stress profile possible with this present invention. The surface layer may have a thickness of at least about 10 mils and preferably 20 to 20 mils in order to prevent loss of strength from scratches. For example the rod in Example VIII can be cut with a diamond saw without shattering and yet withstand scratches. Because in this invention, whereas the interior may contain only 80% of silica (preferably 85%), the surface layer contains in excess of 85% of silica (preferably in excess of 90%), articles made in this fashion are relatively inert chemically and can be used for example in bottles for baby food and for blood plasma. In both these examples the leaching out of sodium is a problem when ordinary soda lime glass is used.

Although presently preferred embodiments of the invention have been shown and described with particularity, it would be appreciated that various changes and modifications may suggest themselves to those of ordinary skill in the art upon being apprised of the present invention. It is intended to encompass all such changes and modifications as fall within the scope and spirit of the appended claims.

We claim:

1. A process for producing a rigid glass product which comprises immersing a porous silicate glass having interconnected pores in a liquid solution of dopant in a liquid solvent therefor to stuff the pores of said glass with said solution, said dopant being precipitatable from said solution, precipitating the dopant to provide a distribution of precipitated dopant within the pores of said glass, subsequently removing solvent from said pores while avoiding destruction of the integrity of the porous glass and avoiding upsetting said distribution of said dopant in said pores, and heating to collapse said pores containing said dopant.

2. Process as claimed in claim 1 wherein said dopant precipitating step is carried out before evaporation of any solvent occurs.

3. Process as claimed in claim 1 wherein said subsequent removal of solvent is by evaporation.

4. Process as claimed in claim 1 wherein said glass before said precipitating step is immersed in a solvent for the dopant to remove at least a portion of said dopant from predetermined areas of said glass.

5. Process as claimed in claim 1 wherein said immersing step comprises successively immersing said glass in at least two successive solutions containing successively lower concentrations of dopant to provide in different portions of the pores of said glass different concentrations of said dopant.

6. Process as claimed in claim 1 wherein said dopant is substantially completely precipitated prior to removing solvent from said pores.

7. Process as claimed in claim 1 wherein said dopant is caused to precipitate by cooling said solution within said pores.

8. Process as claimed in claim 1 wherein said dopant is caused to precipitate by chemical precipitation.

9. Process as claimed in claim 8 wherein said dopant is precipitated by immersing said glass in a solvent in which said dopant is less soluble than the initial solvent.

10. Process as claimed in claim 1 wherein said dopant is precipitated by a combination of cooling said solution in the pores of the glass and by chemical precipitation.

11. Process as claimed in claim 1 wherein said dopant is precipitated by cooling and evaporating said solution in the pores of said glass.

12. Process as claimed in claim 1 wherein after said precipitating step and before said solvent removing step said glass is immersed in additional solvent for said dopant to reduce the concentration of said dopant in said pores of predetermined areas of said glass.

13. Process as claimed in claim 12 wherein after said precipitating step and before immersing said glass in said additional solvent a portion of said solvent of said solution in said pores is removed.

14. Process as claimed in claim 6 wherein after immersion in said dopant solution and before said precipitating step said glass is immersed in a solvent for said dopant so as to change the concentration of said dopant in said pores of predetermined areas of said glass.

15. Process as claimed in claim 1 wherein said solvent is water and is displaced with an organic solvent before the step of removing solvent from said pores.

16. Process as claimed in claim 1 wherein said dopant is a coloring dopant and wherein said step of removing solvent comprises subjecting said glass stuffed with said dopant solution to temperatures in the range of 50° C. to 150° C. below the glass transition temperature of the undoped consolidated glass in a reactive atmosphere for controlling the oxidation state of said coloring dopant.

17. Process as claimed in claim 1 wherein said step of removing solvent from the pores of said glass is commenced in a vacuum at a temperature below room temperature.

18. Process as claimed in claim 1 wherein said solvent is water and the removal of said solvent from the pores of said glass is commenced in a desiccator at or about room temperature.

19. Process as claimed in claim 1 wherein after the bulk of the solvent is removed during the step of removing solvent, the glass is slowly heated at less than 100° C./hr. up to a temperature in the range of 50 to 150° C. below the glass transition temperature of the undoped consolidated glass.

20. Process as claimed in claim 1 wherein said dopant contains a transition metal ion or a rare earth metal ion.

21. Process as claimed in claim 1 wherein said dopant contains cesium, strontium, thorium, uranium or barium.

22. Process as claimed in claim 1 wherein said solution contains more than one dopant.

23. Process as claimed in claim 5 wherein each said successive solution contains a dopant not contained by another said successive solution.

24. Process as claimed in claim 1 wherein said subsequent removal of solvent is by displacement by another solvent.

25. Process as claimed in claim 1 wherein said dopant is selected from the class consisting of oxides or salts of lithium, sodium, potassium, rubidium, cesium, alkaline earth metals, transition metals, noble metals to the extent not included as transition metals, copper, zinc, boron, aluminum, thalium, germanium, tin, lead, phosphorous, arsenic, antimony and bismuth.

* * * * *